United States Patent
Booth, Jr. et al.

(10) Patent No.: US 7,038,687 B2
(45) Date of Patent: May 2, 2006

(54) SYSTEM AND METHOD FOR HIGH-SPEED COMMUNICATIONS BETWEEN AN APPLICATION PROCESSOR AND COPROCESSOR

(75) Inventors: Lawrence A. Booth, Jr., Phoenix, AZ (US); Joel Rosenzweig, Marlborough, MA (US); Jeremy Burr, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 40 days.

(21) Appl. No.: 10/612,291

(22) Filed: Jun. 30, 2003

(65) Prior Publication Data

US 2004/0263521 A1   Dec. 30, 2004

(51) Int. Cl.
- G06T 1/00       (2006.01)
- G06F 15/76      (2006.01)
- G06F 13/14      (2006.01)

(52) U.S. Cl. .................. 345/503; 345/519; 345/520

(58) Field of Classification Search ............... 345/530, 345/522, 519, 520, 501–503, 505, 531, 532; 719/321–323, 328; 710/55; 712/34, 35
See application file for complete search history.

(56) References Cited

U.S. PATENT DOCUMENTS

| | | | | |
|---|---|---|---|---|
| 4,949,280 | A * | 8/1990 | Littlefield | 345/520 |
| 5,432,900 | A * | 7/1995 | Rhodes et al. | 345/519 |
| 5,678,009 | A * | 10/1997 | Bains et al. | 710/125 |
| 5,761,516 | A * | 6/1998 | Rostoker et al. | 710/260 |
| 5,790,138 | A * | 8/1998 | Hsu | 345/542 |
| 5,983,338 | A * | 11/1999 | Moyer et al. | 712/34 |
| 6,184,908 | B1 * | 2/2001 | Chan et al. | 345/522 |
| 6,286,092 | B1 * | 9/2001 | Frank et al. | 711/207 |
| 6,297,832 | B1 * | 10/2001 | Mizuyabu et al. | 345/540 |
| 6,339,427 | B1 * | 1/2002 | Laksono et al. | 345/553 |
| 6,532,530 | B1 * | 3/2003 | Kim et al. | 712/35 |
| 6,675,239 | B1 * | 1/2004 | Van Hook et al. | 710/55 |
| 6,753,870 | B1 * | 6/2004 | Deering et al. | 345/531 |
| 6,754,804 | B1 * | 6/2004 | Hudepohl et al. | 712/34 |
| 6,798,418 | B1 * | 9/2004 | Sartori et al. | 345/519 |
| 2003/0210271 | A1 * | 11/2003 | King | 345/771 |
| 2004/0199798 | A1 * | 10/2004 | Whelan et al. | 713/300 |
| 2004/0217962 | A1 * | 11/2004 | Lewis et al. | 345/506 |
| 2004/0227763 | A1 * | 11/2004 | Wichman et al. | 345/503 |

* cited by examiner

Primary Examiner—Kee M. Tung
(74) Attorney, Agent, or Firm—Schwegman, Lundberg, Woessner & Kluth, P.A.

(57) ABSTRACT

An application processor and coprocessor communicate data, including command and control data, over a separate high-speed datapath. The data may be formatted into a pixel-stream format suitable for sending over the datapath. The application processor may utilize a graphics interface to send pixel-stream formatted data to a graphics interface of the coprocessor over the high-speed datapath rather than over a system bus. The coprocessor may reformat the formatted data to control and drive a graphics display.

24 Claims, 3 Drawing Sheets

SYSTEM AND METHOD FOR HIGH-SPEED COMMUNICATIONS BETWEEN AN APPLICATION PROCESSOR AND COPROCESSOR

TECHNICAL FIELD

Embodiments of the present invention pertain to communications between processors and coprocessors.

BACKGROUND

Many processing systems utilize coprocessors and/or companion devices to offload some processing-intensive processing operations. For example in graphics processing operations, a graphics accelerator or graphics coprocessor may be used to perform graphics-intensive processing operations on behalf of an application processor. In conventional systems, the application processor communicates graphics command and/or control data as well as display data with the coprocessor over a system bus to allow the coprocessor to generate display data for a graphics display. In wireless communication devices, coprocessors and/or companion devices may be used to perform specific wireless related operations on behalf of the application processor.

One problem with such conventional systems is that the bandwidth of the system bus may limit the ability of an application processor to utilize the full capability of the coprocessor or companion device. Thus there are general needs for systems and methods that provide greater bandwidth communication between processors and coprocessors.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of embodiments of the invention encompasses the full ambit of the claims and all available equivalents of those claims.

Figure 1:
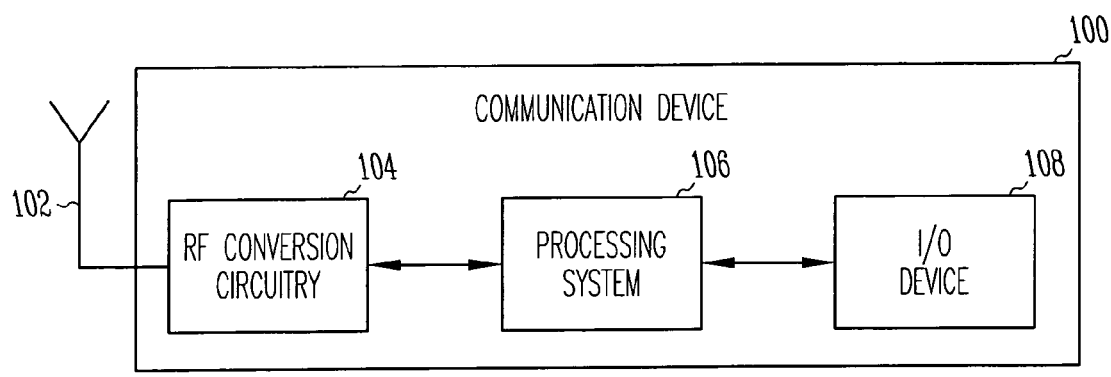
FIG. 1 is a block diagram of a communication device in accordance with embodiments of the present invention.

FIG. 1 is a block diagram of a communication device in accordance with embodiments of the present invention. Communication device 100 may receive and/or transmit radio frequency (RF) communications with antenna 102. RF signals received from antenna 102 may be down-converted to data signals by RF conversion circuitry 104. Data signals may also be up-converted by RF conversion circuitry 104 for transmission by antenna 102. Processing system 106 may communicate data signals with other circuitry (not illustrated), and may further communicate input/output (I/O) data with I/O device 108.

Although some embodiments of the present invention that apply to wireless communications and wireless communication devices are described herein, the scope of the invention is not limited in this respect. Embodiments of the present invention apply equally to wireline communication devices and processing systems. Although some embodiments of the present invention that apply to graphics processing and the generation of graphics data in systems using a graphics coprocessor or graphics companion device are described herein, the scope of the invention is not limited in this respect. Embodiments of the present invention apply equally to processing systems that utilize almost any types of coprocessors and/or companion devices.

In some embodiments, I/O device 108 may comprise one or more of almost any input device, output device or I/O device. Examples of devices suitable for use as device 108 include almost any type of information or graphics display including liquid crystal displays (LCDs), cathode ray tube (CRT) type displays, OLED, PLED, and MEMS displays, electrophoretic displays, electroluminescent displays, liquid crystal on silicon displays, grating displays, interferometric displays, field emissive device displays, etc., although the scope of the invention is not limited in this respect. Other examples of devices suitable for use as device 108 include almost any type of I/O device including, for example, disk drives, smart card readers, retinal scanners, etc., although the scope of the invention is not limited in this respect.

In some embodiments, processing system 106 includes an application processor and a companion device or coprocessor. In some embodiments, the companion device or coprocessor may be a graphics coprocessor which generates image data for displaying on I/O device 108, although the scope of the invention is not limited in this respect. In some embodiments, the application processor and companion device may communicate over a dedicated high-speed datapath. The use of the companion device may provide greater system performance while reducing power consumption. Furthermore, the use of the high-speed datapath may allow improved utilization of the companion device's ability and may also provide additional functionality. Some example embodiments of processing system 106 are described in more detail below.

Communication device 100 may be a personal digital assistant (PDA), a laptop or portable computer with or without wireless communication capability, a web tablet, a wireless telephone, a wireless headset, a pager, an instant messaging device, a digital camera, or any device that may receive and/or transmit information wirelessly. In some embodiments, RF conversion circuitry 104 may transmit and/or receive RF communications in accordance with specific communication standards, such as the IEEE 802.11(a), 802.11(b) and/or 802.11(g) standards for wireless local area network standards, although circuitry 104 may also be suitable to transmit and/or receive communications in accordance with other techniques including the Digital Video Broadcasting Terrestrial (DVB-T) broadcasting standard, and the High performance radio Local Area Network (HiperLAN) standard. Antenna 102 may comprise a directional or omni-directional antenna, including, for example, a dipole antenna, a monopole antenna, a loop antenna, a microstrip antenna or other type of antenna suitable for reception and/or transmission of RF signals which may be processed by RF conversion circuitry 104.

Although communication device 100 is illustrated as a wireless communication device, device 100 may be almost any wireless or wireline communication device, including a general purpose processing or computing system. In some embodiments, device 100 may be a battery-powered device, although the scope of the invention is not limited in this respect. In some embodiments, device 100 may not require antenna 102 and may not require RF conversion circuitry 104.

Figure 2:
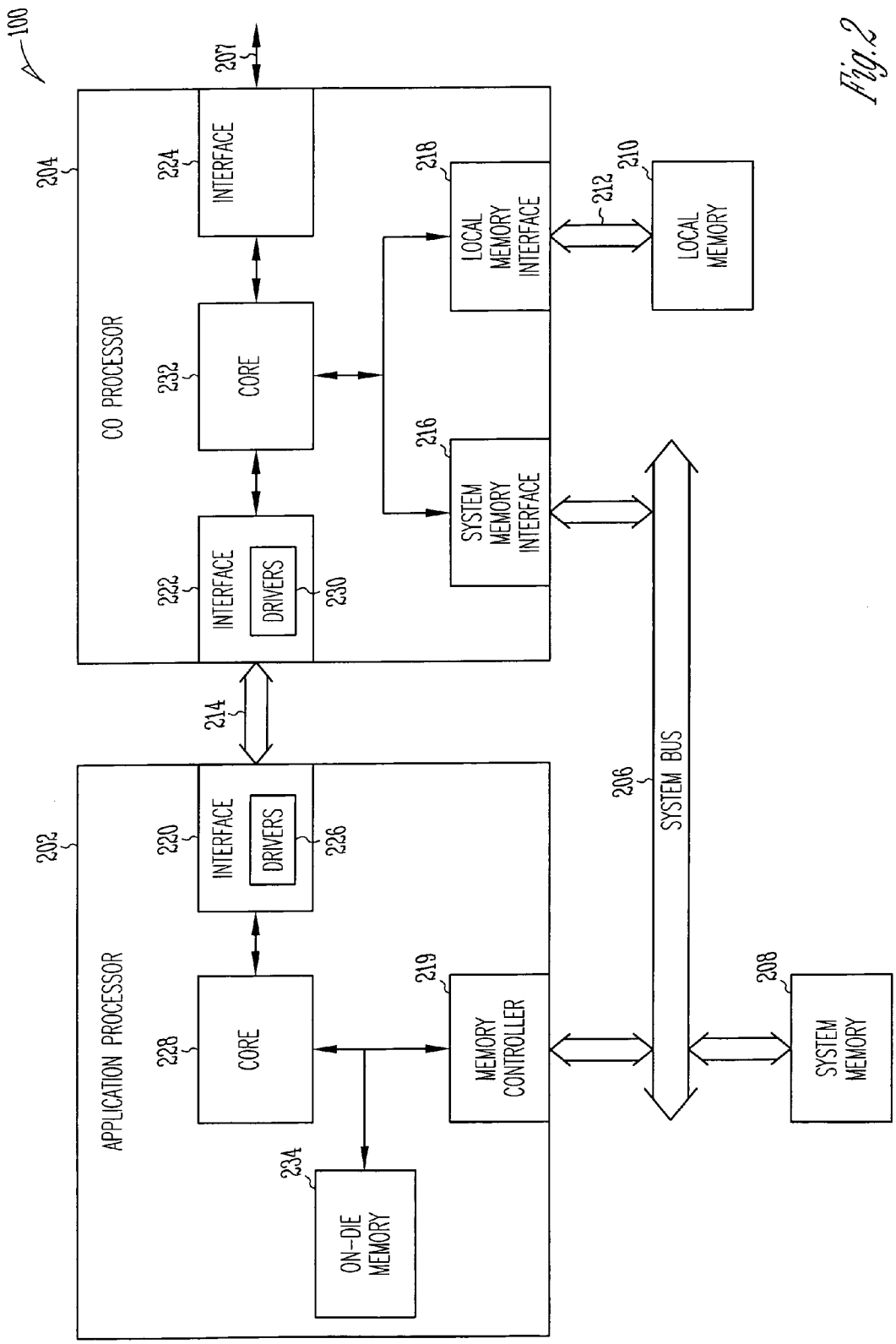
FIG. 2 is a block diagram of a processing system in accordance with embodiments of the present invention.

FIG. 2 is a block diagram of a processing system in accordance with embodiments of the present invention. In some embodiments, processing system 200 may be suitable for use as processing system 106 (FIG. 1), although other processing systems are also suitable. Processing system 200 comprises application processor 202 and coprocessor 204 which generally communicate over system bus 206. In some embodiments, coprocessor 204 may generate output data 207 for a device, such as I/O device 108 (FIG. 1). System memory 208 may be accessed by both application processor 202 and coprocessor 204. Coprocessor 204 may have local memory 210 for dedicated use by coprocessor 204. In some embodiments, coprocessor 204 may be a graphics accelerator and may generate output data 207, which may be image data, for a graphics display based on graphics command and/or control data and image data.

In accordance with some embodiments of the present invention, application processor 202 includes interface 220, and coprocessor 204 includes interface 222. In some graphics embodiments, interfaces 220 and 222 may be graphics interfaces and may be configured to receive pixel-stream formatted data. In some embodiments, formatted graphics command and/or control data and/or formatted image data may be received at interface 222 from interface 220 over high-speed datapath 214. In some embodiments, coprocessor 204 may have display interface 224 to provide display data 207 to an I/O device, which may be a graphics display. High-speed datapath 214 may communicate any data, including command and/or control data between interface 220 and interface 222. In some graphics embodiments, the data may be formatted as a pixel stream which may use the organization and timing of a pixel stream as transmitted to an information display device, although the scope of the invention is not limited in this respect.

In some embodiments, application processor 202 may drive a first display and coprocessor 204 may drive a second display. Examples of these embodiments include systems utilizing more than one display such as a "clamshell" wireless telephone, or a PDA or laptop computer coupled to a projection device. In these embodiments, processor 202 through interface 220 and datapath 214 may drive both the first display and interface 222, while coprocessor 204 and interface 224 may drive the second display based on command and/or control data received over datapath 214.

In some graphics embodiments, graphics interface 220 may comprise drivers 226 to receive graphics command and/or control data from processing core 228 of application processor 202 and to format the graphics command and/or control data into the pixel-stream formatted graphics command and/or control data, although the scope of the invention is not limited in this respect. In some embodiments, graphics interface 222 may comprise drivers 230 to reformat (or unbundle) the pixel-stream formatted graphics command and/or control data back to the graphics command and/or control data, although the scope of the invention is not limited in this respect. In some embodiments, drivers 226 and 230 may comprise hardware and/or software components. In some graphics embodiments, interface 220 may be an LCD controller output of an application processor suitable for directly interfacing with an LCD.

Coprocessor 204 may further comprise coprocessor processing core 232, which among other things, may respond to the command and/or control data and other data received from application processor 202 to generate the data for an I/O device such as a graphics display. In some graphics embodiments, coprocessor processing core 232 may include a graphics accelerator to offload at least some graphics-processing operations from the application processor. The graphics-processing operations may include two-dimensional (2D) graphics operations, three-dimensional (3D) graphics operations, multimedia encoding and decoding operations, and display refresh operations, although the scope of the invention is not limited in this respect. The graphics-processing operations may be indicated by graphics command and/or control data. In some embodiments, the graphics command and/or control data may comprise commands and controls to instruct the coprocessor to perform graphics-processing operations.

In some embodiments, application processor 202 may include on-die memory 234, which may, for example comprise SRAM or FLASH memory, although the scope of the invention is not limited in this respect. Application processor 202 may perform a DMA transfer of data using memory controller 219 from memory 208 and/or on-die memory 234 to coprocessor 204 over high-speed datapath 214, although the scope of the invention is not limited in this respect. In some embodiments, application processor 202 may selectively refrain from transferring data to coprocessor 204 over the system bus 206 to improve performance.

In some embodiments, coprocessor 204 may be an integrated part of a graphics display, although the scope of the invention is not limited in this respect. In these embodiments, the graphics display may include photodiodes, which may allow the display to operate as a scanner to generate image data. Coprocessor 204 may convert the image data to pixel-stream formatted image data to transfer over the high-speed datapath 214 to application processor 202 for further use and/or processing.

In some embodiments, the display data generated by coprocessor 204 for an I/O device may comprise raw pixel data describing each pixel of the graphics display in a per-pixel format. The pixel-stream formatted image data may comprise pixel data in a pixel format, and the pixel-stream formatted command data may comprise command data in pixel format.

In some embodiments, coprocessor 204 may comprise a graphics accelerator, a hardware accelerator, or a companion device. In some embodiments, interface 220 may be a LCD controller interface or a graphics output interface, and interface 222 may be a graphics port or a graphics input interface.

Some communications between application processor 202 and coprocessor 204 may take place over system bus 206 and may utilize system bus cycles in a conventional manner. Although system 200 is illustrated as having system bus 206, embodiments of the present invention apply to the use of any communication link or interconnect structure for communications between the various elements.

Coprocessor 204 may have associated decoders and drivers as part of system memory interface 216 for interfacing with system bus 206 and as part of local memory interface 218 for interfacing with local memory bus 212. In some embodiments, coprocessor 204, memory interfaces 216, 218 and local bus 212, as well as other elements not illustrated, may be located on a separate chip. In some embodiments, local memory 210 may be an off-chip memory or memory structure. In some embodiments, coprocessor 204 may include on-die memory which may be utilized in addition to an off-die memory, such as memory 210.

In some embodiments, datapath 214 may be a high-speed serial datapath. In some embodiments, datapath 214 may comprise a pair of conductors suitable to carry high-speed digital differential signals, although the scope of the invention is not limited in this respect. In other embodiments, datapath 214 may be a parallel datapath or bus. Datapath 214 may be supported by a logic interface, a current-mode interface or a fiber-optic interface, although the scope of the invention is not limited in these respects.

In some embodiments, a coprocessor developer may have defined the syntax for the data stream communications for interface 222. In some embodiments, the developer may have defined a specific protocol for such communications, which may be a simple or a complicated transaction sequence. In some embodiments, a software driver, which may be one of drivers 226, may package data into a format in accordance with the syntax requirements of coprocessor 204, and the driver may copy this formatted data stream into a buffer, such as a LCD frame buffer in the case of LCD devices. The formatted data may be directly transmitted from the buffer to coprocessor 204 over datapath 214. Coprocessor 204 may decode the bit-stream based on the predetermined syntax. Because the syntax may depend on the particular coprocessor, embodiments of the present invention do not require any particular syntax describing the communications over datapath 214. For example, in some embodiments, a communications protocol stack may be utilized to package data for transmission over a serial link (not illustrated). Instead of using the serial link, the data stream may be directly transmitted via datapath 214 by copying the data stream into the LCD frame buffer rather than sending the data stream serially over the serial link.

Examples of applications which may run on application processor 202 may depend on the primary purpose of system 200. For example, when system 200 is part of a personal computer or processing system, applications may include any software program running thereon. When system 200 is part of a wireless communication device (e.g., PDA, wireless telephone, web tablet), applications may include software and programs that relate to wireless communications. When system 200 serves as a microcontroller, applications may include dedicated control-type applications.

In some embodiments, coprocessor 204 may be used to perform tasks that could be performed by the application processor, such as repetitive tasks that may require system memory access. Examples of such tasks include display refresh (e.g., for a graphics chip), and other graphics intensive operations which may require access to local memory 210 or may have bus mastering capabilities to use system memory 208. This offloading of tasks from the application processor to the coprocessor may reduce power consumption because the application processor may, for example, be turned off or not used during these operations. For example, the application processor may not be needed for display refresh operations. This offloading may also free up processing cycles of the application processor and free up system bandwidth allowing for faster and more efficient processing by the application processor. In the case of a wireless device or chip, the companion device may maintain wireless network connectivity while the application processor sleeps, and may wake-up the application processor, for example, when information is received over the network.

Portions of local memory 210 may be accessed by coprocessor 204 for these offloaded operations, although in some embodiments, the companion device may also utilize portions of system memory 208 over datapath 214 (rather than over system bus 206) when additional memory is required, although the scope of the invention is not limited in this respect.

In some embodiments, high-speed datapath 214 may relieve system bus 206 of display-refresh traffic, which may comprise data rates of up to 250 Mbytes/Sec and even greater. In some embodiments, the display refresh function may be performed almost entirely by coprocessor 204 and iterations of a displayed image may be passed over datapath 214 to further relieve use of system bus 206. Accordingly, system bus 206 may no longer limit the graphics capability of a device, and substantially more image data and more processed image data may be presented to a display through use of datapath 214.

In some embodiments, coprocessor 204 and associated local memory 210 may be part of a separate semiconductor device/chip or card from other system elements, although the scope of the invention is not limited in this respect. In some embodiments, dynamic random access memory (DRAM), SDRAM or Flash, as well as other types of memory, and combinations thereof may be suitable for use for system memory 208 and local memory 210.

In some embodiments, graphics primitives may be block transferred from application processor 202 to coprocessor 204 over datapath 214. In some embodiments, graphics primitives may be block transferred by first storing a block of graphics primitives in a memory array local to application processor 202. This block of data may then be transferred to the coprocessor via a software memory copy operation or a hardware DMA operation, although the scope of the invention is not limited in this respect. If necessary, the data may be formatted and organized to fit the form of a pixel-data stream before being transferred across the interface. Although multimedia data may include many different content data types, it may be formatted and organized in the same or similar manner.

In some wireless embodiments, coprocessor 204 may be a wireless companion chip to perform wireless-specific tasks, such as maintaining network connectivity or generating encoded voice or data for wireless communications. In these wireless embodiments, application processor 202 may communicate wireless data with coprocessor 204 in a data-stream format over high-speed datapath 214. In some of these wireless embodiments, interface 224 may provide an interface to RF circuitry, such as RF circuitry 104 (FIG. 1) including associated off-chip components, such as a low-noise amplifier (LNA), power amplifier (PA), RF switches, filters, and/or an antenna. The functions of these elements may not necessarily be integrated into coprocessor 204. In these embodiments, core 232 may perform integrated wireless transceiver functions. In these embodiments, the data communicated over datapath 214 may include digitally encoded data or voice communication signals. In these embodiments, transceiver functions may be allocated between application processor 202 and coprocessor 204 and may be allocated in a manner similar to the graphics functions previously described. In these embodiments, functions provided by separate functional blocks controlled by a single processor including some of the modulation and demodulation functions may be performed in software and/or hardware within application processor 202, instead of all functions being performed in the transceiver's coprocessing functions. In other words, functions that were performed using a single processor may be divided into separate function processing subsystems each with their own coprocessor.

Although system 200 is illustrated as having several separate functional elements, one or more of the functional elements may be combined and may be implemented by combinations of software-configured elements, such as processing elements including digital signal processors (DSPs), and/or other hardware elements. For example, processing elements may comprise one or more microprocessors, DSPs, application specific integrated circuits (ASICs), and combinations of various hardware and logic circuitry for performing at least the functions described herein.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing or processing device or system includes one or more processing elements coupled with computer readable memory that may be volatile or non-volatile memory or a combination thereof.

Figure 3:
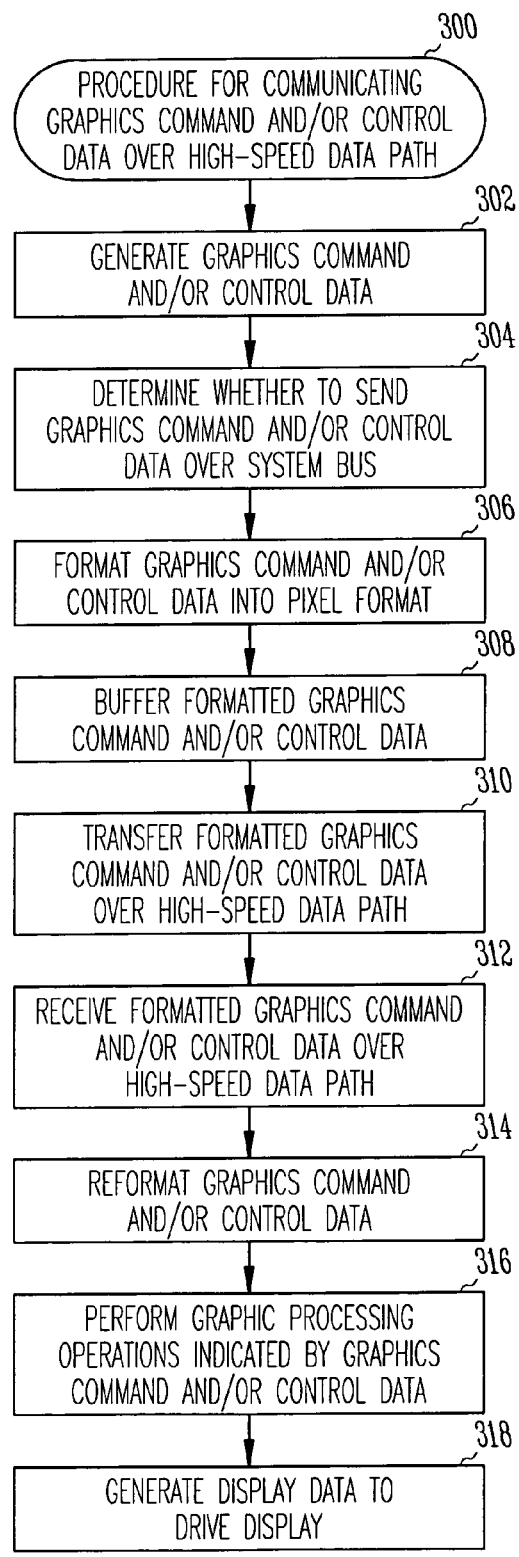
FIG. 3 is a flow chart of a procedure for communicating between a processor and a coprocessor in accordance with embodiments of the present invention.

FIG. 3 is a flow chart of a procedure for communicating between a processor and a coprocessor in accordance with embodiments of the present invention. Procedure 300 may be performed by a system having an application processor and coprocessor coupled by a high-speed datapath, such as system 200 (FIG. 2), although other systems may be suitable for performing procedure 300. Although procedure 300 is described for some graphics embodiments, the scope of the present invention is not limited in this respect. Procedure 300 is applicable to other embodiments.

Operation 302 generates command and/or control data with the application processor. The command and/or control data may be graphics command and/or control data to be utilized by a graphics coprocessor. In operation 304, the application processor may determine whether to send the command and/or control data to the coprocessor over a system bus, such as bus 206 (FIG. 2), or over a high-speed link, such as datapath 214 (FIG. 2). As part of operation 304, the application processor may refrain from sending graphics command and/or control data and/or image data over the system bus to free up the system bus for other system operations. When the application processor decides to utilize a high-speed datapath instead of the system bus, at least operations 306 through 314 may be performed.

Operation 306 formats the command and/or control data into a format for transfer over a high-speed datapath to a coprocessor. In some embodiments, the command and/or control data may be formatted into a pixel-stream format (e.g., to look like raw pixel data). In operation 308, the formatted command and/or control data may be buffered in a buffer memory and in operation 310, the formatted command and/or control data may be transferred from the buffer over the high-speed datapath to the coprocessor.

In operation 312, the formatted command and/or control data and/or image data may be received by the coprocessor over the high-speed datapath (e.g., rather than the system bus). In operation 314, the coprocessor may reformat the received data to extract the original command and/or control data. In operation 316, the coprocessor may perform the operations indicated by the command and/or control data and may generate display data in operation 318 to drive a display or other I/O device.

Although the individual operations of procedure 300 are illustrated and described as separate operations, one or more of the individual operations may be performed concurrently and nothing requires that the operations be performed in the order illustrated.

It is emphasized that the Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features that are expressly recited in each claim. Rather, as the following claims reflect, inventive subject matter lies in less than all features of a single disclosed embodiment. Thus the following claims are hereby incorporated into the detailed description, with each claim standing on its own as a separate preferred embodiment.

What is claimed is:

1. A processing system comprising:
   an application processor having a first graphics interface;
   a coprocessor having a second graphics interface to communicate pixel-stream formatted graphics command data and pixel-stream formatted image data with the application processor, the coprocessor also having a display interface to provide display data to a graphics display; and
   a high-speed datapath between the first graphics interface and the second graphics interface,
   wherein the first graphics interface comprises first drivers to receive graphics command data from a processing core of the application processor and to format the graphics command data into the pixel-stream formatted graphics command data, and
   wherein the second graphics interface comprises second drivers to reformat the pixel-stream formatted graphics command data back to the graphics command data.

2. The processing system of claim 1,
   wherein the first drivers and the second drivers comprise at least one of either hardware or software components, and
   wherein the high-speed datapath comprises a pair of conductors to carry high-speed digital differential signals.

3. The processing system of claim 1 wherein the coprocessor further comprises a coprocessor processing core responsive to the graphics command data and image data to generate the display data for the graphics display.

4. The processing system of claim 1 wherein the coprocessor comprises a graphics accelerator to offload at least some graphics-processing operations from the application processor, the graphics-processing operations including at least one of two-dimensional (2D) graphics operations, three-dimensional (3D) graphics operations, multimedia encoding and decoding operations, and display refresh operations, the at least some graphics-processing operations indicated by the graphics command data.

5. The processing system of claim 1 wherein the pixel-stream formatted graphics command data comprises commands to instruct the coprocessor to perform graphics-processing operations including at least one of two-dimensional (2D) graphics operations, three-dimensional (3D) graphics operations, multimedia encoding and decoding operations, and display refresh operations.

6. The processing system of claim 1 further comprising a system bus and a system memory, wherein the application processor has a memory controller to access the system memory over the system bus, and wherein the coprocessor has a system memory interface to access the system memory over the system bus.

7. The processing system of claim 6 wherein the application processor further comprises on-die memory therein, the application processor performs a DMA transfer of graphics data from the on-die memory to the coprocessor over the high-speed datapath, and the application processor refrains from transferring the graphics data to the coprocessor over the system bus.

8. The processing system of claim 1 wherein the coprocessor is an integrated part of the graphics display.

9. The processing system of claim 8 wherein the graphics display comprises photodiodes to generate image data of a scanned image, and the coprocessor converts the image data to pixel-stream formatted image data for transfer over the high-speed datapath to the application processor.

10. The processing system of claim 1 wherein the display data describes pixels of the graphics display in a per-pixel format, and wherein the pixel-stream formatted image data comprises pixel data in a pixel format, and wherein the pixel-stream formatted command data comprises command data in a pixel format.

11. The processing system of claim 1 wherein the coprocessor comprises one of a graphics accelerator, a hardware accelerator, or a companion device.

12. The processing system of claim 1 further comprising:
an omnidirectional antenna to receive communication signals; and
a receiver to translate the communication signals to data signals for the application processor, the communication signals including graphics data,
the application processor generates the graphics command data from the received graphics data, and transfers the pixel-stream formatted graphics command data over the high-speed datapath to the coprocessor, the coprocessor reformats the pixel-stream formatted graphics command data and generates display data for display by the graphics display.

13. The processing system of claim 12 comprising one of either a personal digital assistant (PDA) or a wireless telephone.

14. The processing system of claim 1 comprising a general processing system.

15. A communication device comprising:
an application processor having a first interface;
a coprocessor having a second interface to receive formatted command data and output data from the application processor, the coprocessor also having an output interface to provide the output data to an I/O device; and
a high-speed datapath to communicate the formatted command data and the formatted output data between the first interface and the second interface, wherein the formatted command data and the formatted output data are in an output-data formats,
wherein the first interface comprises first drivers to receive command data from a processing core of the application processor and to format the command data into the formatted command data, and
wherein the second interface comprises second drivers to reformat the formatted command data back to the command data.

16. The device of claim 15 wherein the coprocessor further comprises a coprocessor processing core responsive to the command data and the output data to provide the output data for the I/O device,
wherein the output-data format comprises a pixel-stream format, and
wherein the output data comprises image data.

17. A communication device comprising:
an application processor having a first interface;
a coprocessor having a second interface to receive formatted command data and formatted output data from the application processor, the coprocessor also having an output interface to provide output data to an I/O device; and
a high-speed datapath to communicate the formatted command data and the formatted output data between the first interface and the second interface,
wherein the first interface comprises first drivers to receive unformatted command data from a processing core of the application processor and to format the unformatted command data into the formatted command data,
wherein the second interface comprises second drivers to reformat the formatted command data back to the unformatted command data,
wherein the first drivers and the second drivers comprise hardware and software components, and
wherein the high-speed datapath comprises a pair of conductors to carry high-speed digital differential signals.

18. A communication device comprising:
an application processor having a first interface
a coprocessor having a second interface to receive formatted command data and formatted output data from the application processor, the coprocessor also having an output interface to provide output data to an I/O device;
a high-speed datapath to communicate the formatted command data and the formatted output data between the first interface and the second interface; and
a system bus and a system memory,
wherein the application processor has a memory controller to access the system memory over the system bus, and wherein the coprocessor has a system memory interface to access the system memory over the system bus,
wherein the first interface comprises first drivers to receive command data from a processing core of the application processor and to format the command data into the formatted command data, and
wherein the second interface comprises second drivers to reformat the formatted command data back to the command data.

19. The device of claim 18 wherein the application processor further comprises on-die memory, the application processor performs a DMA transfer of data from the on-die memory to the coprocessor over the high-speed datapath, and the application processor refrains from transferring the data to the coprocessor over the system bus.

20. A communication device comprising:

an application processor having a first interface;

a coprocessor having a second interface to receive formatted command data and formatted output data from the application processor, the coprocessor also having an output interface to provide output data to an I/O device; and a high-speed datapath to communicate the formatted command data and the formatted output data between the first interface and the second interface, wherein the first interface comprises first drivers to receive command data from a processing core of the application processor and to format the command data into the formatted command data, wherein the second interface comprises second drivers to reformat the formatted command data back to the command data.

wherein the I/O device includes RF circuitry to interface with an antenna for communication of RF signals, the application processor and coprocessor communicate at least one or either digitally encoded data or digitally encoded voice signals over the high-speed datapath, wherein wireless transceiver functions are allocated between the applications processor and the coprocessor for wireless communications.

21. A communication system comprising:

an omnidirectional antenna to receive communication signals;

a receiver to translate the communication signals to data signals; and a processing system having an application processor and a coprocessor coupled by a high-speed datapath, wherein the application processor receives the data signals and generates and sends data-stream formatted graphics command data and data-stream formatted image data to the coprocessor over the high-speed datapath, the coprocessor having a display interface to generate and to provide display data for a graphics display, wherein the first graphics interface comprises first drivers to receive graphics command data from a processing core of the application processor and to format the graphics command data into the data-stream formatted graphics command data, and wherein the second graphics interface comprises second drivers to reformat the data-stream formatted graphics command data back to the graphics command data.

22. The system of claim 21, wherein the first drivers and the second drivers comprise at least one of either hardware or software components, and wherein the high-speed datapath comprises a pair of conductors to carry high-speed digital differential signals.

23. The system of claim 21 wherein the coprocessor further comprises a coprocessor processing core responsive to the graphics command data and image data to generate the display data for the graphics display.

24. The system of claim 21 wherein the coprocessor comprises a graphics accelerator to offload at least some graphics-processing operations from the application processor, the graphics-processing operations including at least one of two-dimensional (2D) graphics operations, three-dimensional (3D) graphics operations, multimedia encoding and decoding operations, and display refresh operations, the at least some graphics-processing operations indicated by the graphics command data.

* * * * *

UNITED STATES PATENT AND TRADEMARK OFFICE
CERTIFICATE OF CORRECTION

PATENT NO. : 7,038,687 B2
APPLICATION NO. : 10/612291
DATED : May 2, 2006
INVENTOR(S) : Booth, Jr. et al.

It is certified that error appears in the above-identified patent and that said Letters Patent is hereby corrected as shown below:

In column 9, line 67, in Claim 15, delete "formats," and insert - - format, - -, therefor In column 10, line 40, in Claim 18, after "interface" insert - - ; - -.

In column 11, line 17, in Claim 20, delete "data." and insert - - data, - -, therefor Signed and Sealed this Fifth Day of September, 2006

JON W. DUDAS
*Director of the United States Patent and Trademark Office*